INVENTOR
FRED B. SHAW

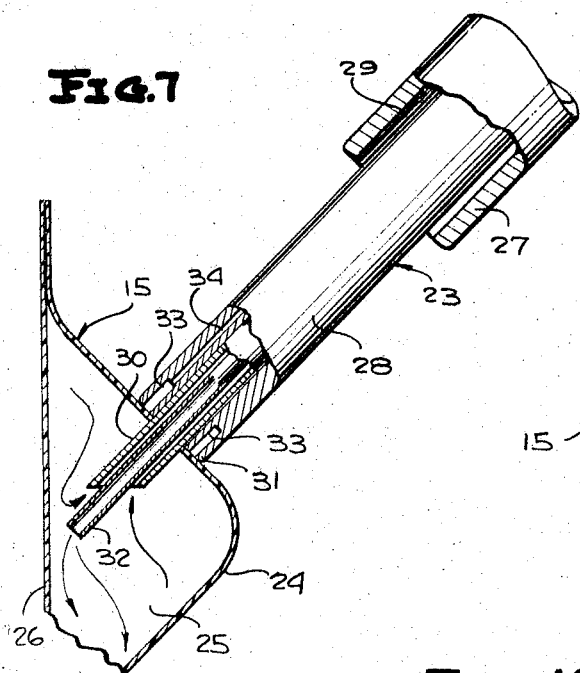
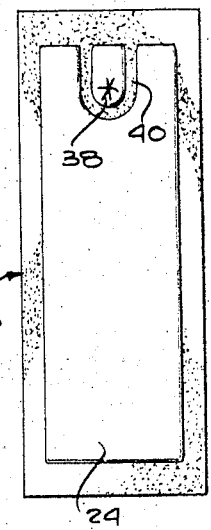
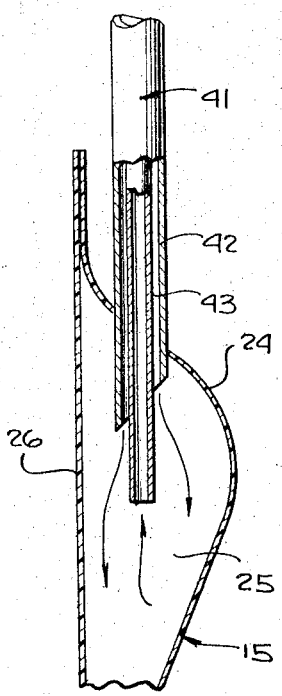
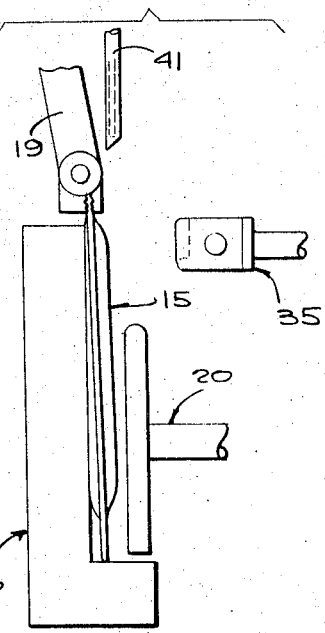
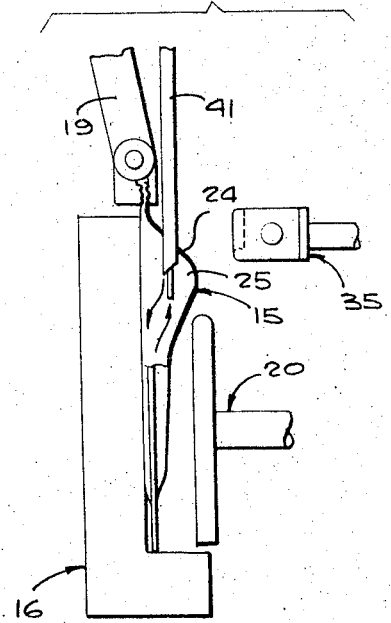
INVENTOR
FRED B. SHAW

United States Patent Office 3,299,603
Patented Jan. 24, 1967

3,299,603
METHOD OF FILLING POUCHES
Fred B. Shaw, Mount Vernon, Ohio, assignor to Continental Can Company, Inc., New York, N.Y., a corporation of New York
Original application Mar. 12, 1962, Ser. No. 179,048, now Patent No. 3,245,200, dated Apr. 12, 1966. Divided and this application Sept. 11, 1963, Ser. No. 308,176
32 Claims. (Cl. 53—22)

This is a divisional and a continuation-in-part application of application Serial No. 179,048, filed March 12, 1962, now Patent No. 3,245,200.

This invention relates to a method for filling pouches, which have been previously sealed, with a flowable material and especially relates to the method for preparing aseptic product filled pouches.

In the packaging of materials and especially foodstuffs which are subject to deterioration and decomposition upon standing, it has been found extremely desirable to be able to package such material in a flexible pouch in such a manner that it could be subsequently stored at room temperature for an unlimited duration of time without subsequent spoilage. The invention is specifically useful for the packaging of food products in flexible pouches; however the invention is not limited thereto, as products such as whole blood, petroleum jelly in a flowable state, finely divided flowable silica gel and high purity chemicals and solutions thereof may be packaged according to the present invention with success equal to that encountered in the packaging of food products.

The present invention, therefore, has particular utility not only with liquids in the most restricted sense but also with materials which are flowable under the specific conditions of the invention such as fluid solutions, emulsions, suspensoids and other flowable mixtures which might include the foregoing with gaseous entrainments as minor constituents.

It is known in the aseptic packaging of solids and semisolids, which are not readily flowable, to package these materials under make-and-fill conditions and then subject the ultimate packages to a sterilization process so as to obtain the necessary storage life. Product packaging under make-and-fill conditions is available with existing commercial equipment, such as utilized in the packaging of products in metal cans. The use of such equipment in packaging readily flowable products is, however, undesirable as it is well known that make-and-fill equipment and methods are primarily useful when packaging solid or semi-solid products, but that the well known inadequacies of make-and-fill machines for flowable products makes this procedure questionable in the case of such fluid materials. It should also be realized that it would be expensive to produce a flexible filled pouch which would withstand the sterilization processes after such pouch has been filled. Normally the packaged product is subjected to sterilizing conditions in a retort or autoclave.

By sterilizing the pouches prior to their filling, various economies may be achieved and greater varieties of materials may be utilized. For example, lighter gage structures of retort processible pouches can be successfully exposed to retorting when the pouches do not carry any filling. Further, pouch structures totally incapable of withstanding the thermal stresses of retorting may be pre-sterilized by gas sterilization, as with ethylene oxide; or by radiation sterilization, as by an electron beam or gamma radiation.

When sterilizing such pouches by the use of alkylene oxide, such as ethylene oxide or propylene oxide, it has been found desirable to introduce such sterilizing substance into the pouches at the formation step prior to completion of the seal around the edges thereof. When use is made of relatively gas impervious sheet material for the pouch construction, the introduction of the alkylene oxide at the time of formation is necessary in order to achieve the various economies presented by the instant method. When a gas permeable sheet material such as polyethylene or vinyl polymer is used for the pouch construction, the sterilizing substance may be introduced through the gas permeable sheet material of the sealed pouches in a pressurization chamber.

Such exposure to a sterilizing gas in pressurization chambers involves relatively long periods of time as the gas must penetrate through the film into the pouch and destroy the micro-organisms after which most of the gas is removed by venting in a gassing chamber and any residual sterilizing gas is allowed to escape by natural diffusion. The filling of the sealed pouches with foodstuffs must not take place until the residual sterilizing gas level is low enough so that foodstuffs contamination from such gases is within the limits set by the Federal Drug Administration.

The use of relatively gas impervious sheet materials, such as those constructed from laminate sheet materials including a metal foil as a layer thereof, are particularly advantageous but may not be sterilized in such a pressurization chamber as that set out above. The gas impervious sheet materials are particularly useful for packaging substances which are subject to taste, flavor or appearance modification and changes by contact with oxygen and/or light. However, the gas impervious nature of such pouch materials restricts the use of the pressurization chambers for sterilization with the alkylene oxides. It is necessary, therefore, to introduce the alkylene oxide sterilizing substance into the pouches prior to the final sealing thereof. After such introduction, the alkylene oxide is retained in the sealed pouch for a time period sufficient to kill all micro-organisms. Various alkylene oxides may be used together with or without inert gases and/or water as a liquid or gas.

It is, therefore, an object of the present invention to provide a method of filling a sealed pre-sterilized pouch made by the introduction of a volatile alkylene oxide prior to the sealing thereof by aseptically introducing a sterile fill into the pre-sterilized pouch.

Another object of the instant invention is to provide a method of filling a sealed pre-sterilized pouch under aseptic conditions with a sterile fill in which the pre-sterilized pouch has been so sterilized by introduction of an alkylene oxide into the pouch prior to the sealing thereof and retaining the alkylene oxide for a time period sufficient to kill all micro-organisms. The filling by this method is carried by inflating a portion of the sealed, pre-sterilized pouch, thereafter puncturing one wall of the pouch at said inflated portion by a needle-like filler member, filling the pouch with a sterile flowable material and finally sealing the puncture formed by said filler member from the rest of the pouch.

Following the above objects the alkylene oxide introduced prior to the sealing of the pouch may be either ethylene oxide or propylene oxide with or without other gaseous inert diluents and/or moisture.

A further object of the present invention is to provide a method of making a filling, a sealed pouch under aseptic conditions by forming a pouch from a heat sealable plastic sheet material, introducing a volatile alkylene oxide prior to sealing, sealing all edges of the sheet material to form a seal pouch, retaining the alkylene oxide for a time period sufficient to kill all micro-organisms, supporting the pouch in a position to be filled, inflating a portion of said pouch utilizing the gases therein, moving a filler member through one wall of said pouch within said inflated portion for communication with the interior of said pouch, introducing flowable material into said pouch through said filler member while simultaneously removing the gases trapped within said pouch, and completely sealing off the puncture formed by said filler member from the rest of the pouch.

Following the above objects the trapped gases may be removed by the use of a vacuum, if the sheet material from which the pouch is constructed has sufficient rigidity or by the use of an inert sweep gas where the pouch material is less rigid or where otherwise desirable.

It is another object of the present invention to prepare aseptic, product filled pouches by aseptically introducing a sterile fill into a sterile pouch.

It is also an object of this invention to prepare aseptic, product filled pouches by inflating a portion of a sealed, sterile pouch, thereafter puncturing one wall of the pouch at said inflated portion by a needle-like filler member, filling the pouch with a sterile flowable material and finally sealing off from the rest of the pouch, an area immediately surrounding the puncture formed by the needle-like filler member.

It is another object of this invention to provide a method for preparing aseptic, product filled pouches in which a pre-sterilized pouch having a small amount of gas therein is squeezed together so as to inflate a small portion thereof, a needle-like filler member is inserted through one wall of the pouch in said inflated area and utilized to fill the pouch with sterile flowable material.

It is still another object of this invention to provide a method of preparing aseptic, product filled pouches in which an already sterile and completely sealed pouch having a small amount of gas therein is squeezed together over major portions thereof so as to inflate a minor portion thereof and to present a ballooned or bulged portion for ease in puncture with a needle-like filler member, filling the pouch with a sterile flowable material, withdrawing the needle-like filler member and sealing off an area immediately surrounding the puncture caused by the needle-like filler member from the rest of the pouch.

It is a further object of this invention to provide a method of preparing aseptic, product filled pouches in which an already sterile and completely sealed pouch having a small amount of gas therein is squeezed together over major portions thereof so as to inflate a minor portion thereof so as to present a ballooned or bulged portion for ease in puncture with a needle-like filler member, filling the pouch with a sterile flowable material, withdrawing the needle-like filler member, and entirely sealing an area of the pouch surrounding the puncture so as to prevent the contamination of the material in the pouch.

It is still a further object of this invention to provide a method for preparing aseptic, product filled pouches in which a portion of a sterile, sealed pouch is inflated so as to present a more readily puncturable wall surface to a needle-like filler member, puncturing the wall with the needle-like filler member and filling the interior of the pouch while securely holding a portion of the wall surrounding the puncture to the needle-like filler member by suction, withdrawing the needle-like filler member and sealing the pouch in an area surrounding the puncture.

Another object of this invention is to provide a method for preparing aseptic, product filled pouches in which a portion of a sterile, sealed pouch is inflated so as to present a more readily puncturable wall surface to a needle-like filler member, puncturing the wall with the needle-like filler member, filling the interior of the pouch, sealing the area surrounding the puncture and then withdrawing the needle-like filler member.

With the above, and other objects in view that will hereinafter appear, the nature of the invention will be more clearly understood by reference to the following detailed description and the several views illustrated in the accompanying drawings.

In the drawings:

FIGURE 7 is a partial sectional view on a much larger scale and shows the details of one embodiment of the needle-like filler member.

FIGURE 8 is a plan view of one embodiment of an aseptic product filled pouch of the present invention.

FIGURE 9 is a plan view of another embodiment of an aseptic product filled pouch of this invention similar to the showing of FIGURE 8.

FIGURE 10 is a partial and somewhat diagrammatic end view of the apparatus for preparing aseptic product filled pouches similar to the apparatus illustrated by FIGURES 1 through 3, of the drawings, but presents another embodiment thereof.

FIGURE 11 is an end view of the apparatus for filling pouches with aseptic flowable materials similar to FIGURE 10, with parts of the pouch being broken away for clarity and showing the needle-like filler member in puncture engagement with one wall of the pouch.

FIGURE 12 is a partial sectional view on a much larger scale showing the details of the needle-like filler member of the embodiment shown in FIGURE 11 of the drawings.

Figure 1:
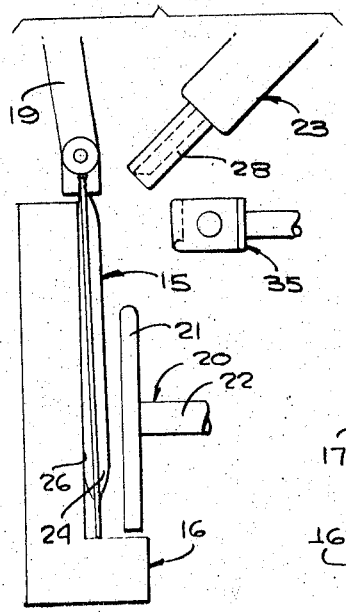
FIGURE 1 is a partial and somewhat diagrammatic end view of the herein presented means for preparing aseptic, product filled pouches in which the relationship of the various elements is clearly presented.
Figure 2:
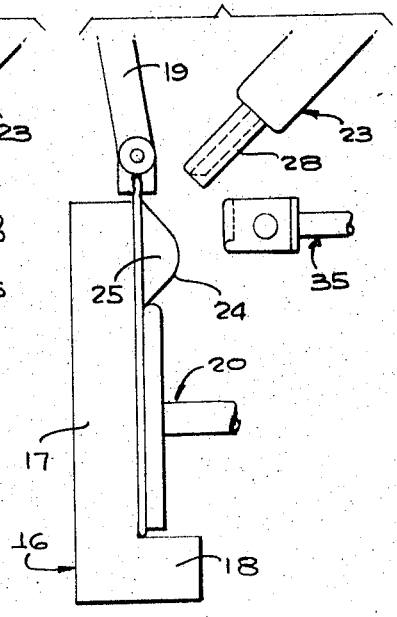
FIGURE 2 is a view of the apparatus similar to FIGURE 1, but showing the presser plate in pressing engagement against the bottom portions of the pouch and causing an inflation of the top portion of the pouch.

Referring to the drawings, and, in particular, to FIGURES 1 through 7 thereof, there is shown therein one embodiment of the present invention. In FIGURE 1, the first stage of the operation is shown wherein a pouch 15 is placed upon a support member 16 in position to be filled. The pouch is normally composed of thin walled plastic material which is either entirely sealed on all four sides thereof as illustrated in FIGURES 8 and 9 of the drawings, or completely sealed on certain sides thereof within one or more of the other sides being a fold. The support may be of any general type and is herein shown as constituting a vertical element 17 and a supporting horizontal element 18. A jaw-type holder 19 is positioned to clamp the upper portion of the pouch and to aid in retaining the pouch in general parallel relationship to the vertical portion 17 of the support 16. A presser plate 20 having a head 21 and a reciprocatable piston 22 is positioned adjacent to the lower portions of the pouch 15 and is reciprocatable normal to the position of the pouch 15 so as to press the lower portions of the pouch together and expand the gases contained therein to the opposite or upper end of the pouch as shown in FIGURE 2.

The forcing of the gases contained within the lower portion of the pouch upwardly into the upper portion inflates the upper portion and facilitates the ease in which the needle-like filler member, generally designated 23, may be inserted through the forward wall 24 of the inflated portion 25 of the pouch 15, it being obvious that without such inflation, it would be, indeed, difficult to puncture one of the walls, e.g., wall 24, without puncturing the other wall 26, as most clearly shown in FIGURE 7.

It should also be explained at this time that the inflation of the pouch may be carried out by other means, such as the application of heat by infra-red lamps upon the pouch to cause an expansion of the gases contained therein.

Figure 3:
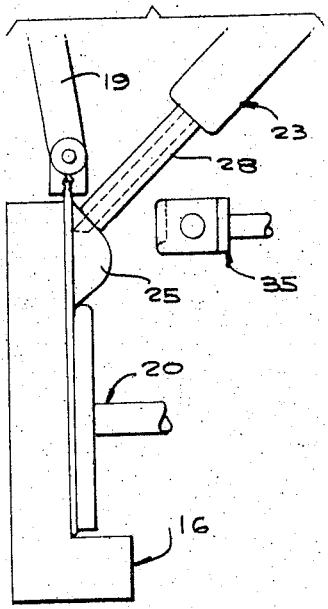
FIGURE 3 is a view of the apparatus similar to the previous figures, but showing the needle-like filler member in puncture engagement with one wall of the pouch.

As most clearly shown in FIGURE 3 of the drawings, the needle-like filler member 23 is brought into engagement with the wall 24 of the inflated portion 25 so as to puncture the wall 24 and to be in position to introduce a flowable fill material, particularly aseptic fill, into the interior of the pouch 15. The details of the needle-like filler member 23 may be had from observation of FIGURE 7 of the drawings in particular wherein the needle-like filler member 23, preferably of the hypodermic type, is shown as having an upper barrel portion 27 into which a holder 28 is inserted by means of a collar 29. The holder 28 is generally of cylindrical shape and is in receipt of a hollow needle 30 which is operable from a position extending past the forward butt portion 31 of the holder 28 to a position of hiding within the confines of the holder 28. A hollow tube is further reciprocatable within and spaced from the hollow needle 30 and forms a filling duct 32 through which a flowable material contained in the upper portions of the needle-like filler member 23 may be transported therefrom into the interior of the pouch 15.

The hollow space separating the wall of the filling duct 32 from the wall of the hollow needle 30 forms a vent for the gases contained within the pouch 15 to escape during the replacement thereof by the flowable material introduced through the filling duct 32. The forward butt portion 31 of the holder 28 is further provided with an annular recess 33 which is, in turn, connected to a pipe 34 for operation with a vacuum source (not shown) for producing a vacuum in the annular recess 33 so that the forward butt portion 31 of the needle-like filler member 23 may be held securely against the forward wall 24 of the inflated portion 25 of the pouch 15 by the vacuum within the recess 33.

It should be noted that the needle-like filler member 23 as shown in FIGURE 7 of the drawings is positioned against the upper surface of the distended or inflated portion 25 of the pouch 15 and that the suction applied through the annular recess 33 aids in retaining this previously-mentioned distended or inflated condition of the pouch 15. The vacuum pull exerted through the annular recess 33 further assists in the entry of the hollow needle 30 through the wall 24 of the pouch.

Figure 4:
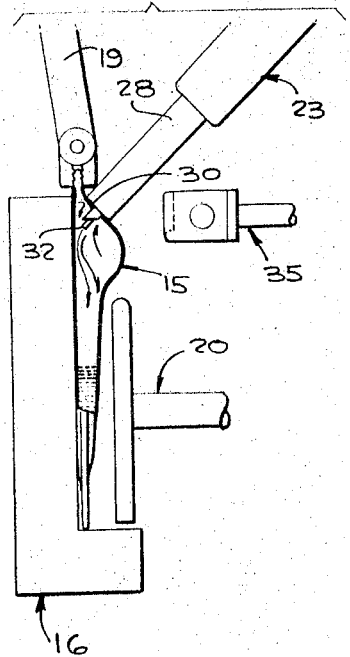
FIGURE 4 is a view of the apparatus similar to FIGURES 1 through 3, but with portions of the pouch broken away for clarity, and shows the pouch being filled with a sterile flowable material.
Figure 5:
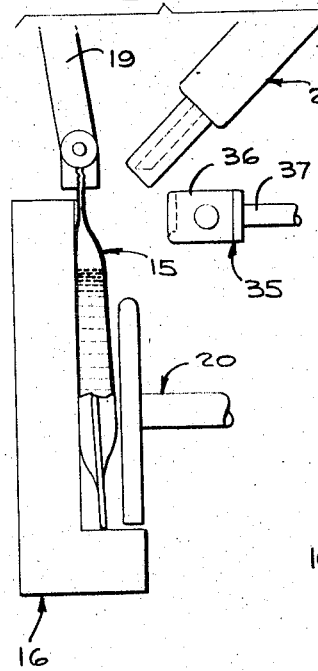
FIGURE 5 is a view of the apparatus similar to that shown by FIGURE 4, the needle-like filler member having been removed from the wall of the pouch and the pouch filled with the sterile flowable material.
Figure 6:
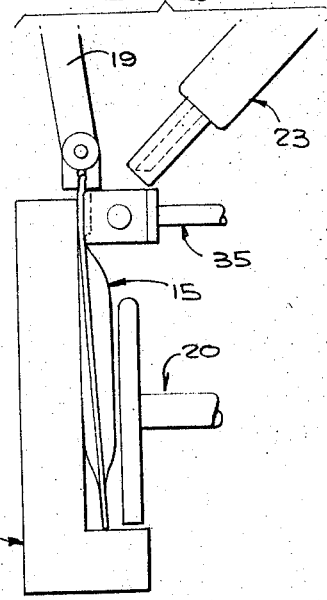
FIGURE 6 is a view of the apparatus similar to the showing in FIGURES 1 through 3, and in particular illustrates the sealing member in engagement with the pouch and surrounding the puncture formed by the needle-like filler member.

Turning for the moment back to the operational sequence of the process as shown by FIGURES 1 through 6 of the drawings, there is therein shown in FIGURE 4 thereof the withdrawal of the presser plate 20 upon tthe filling of the pouch 15. As clearly shown, sterile flowable material enters the pouch through the filling duct 32 and the gases forced therefrom are vented through the space formed by the hollow needle 30 and the filling duct 32. When the pouch is filled with the flowable material to the desired level, the needle-like filler member 23 is withdrawn to its original position as shown in FIGURE 5 of the drawings so as to clear the line of reciprocation of a sealing member 35.

The sealing member 35 may be of conventional design and consists primarily of a heated sealing head 36 mounted upon a reciprocable plunger 37 for movement into contact and away from the upper edge of the filled pouch. The sealing member 35 is then moved into position against the pouch so as to clamp the walls 24 and 26 thereof against the vertical portion 17 of the support 16 and to heat seal an area surrounding a puncture 38 made by the needle-like tube 30 of the filler member 23 completely off from the rest of the pouch.

Referring to FIGURES 8 and 9 of the drawings, there is therein shown two types of sealing designs that may be applied to the walls 24 and 26, respectively, of the filled pouch 15 so as to seal the puncture 38 (represented by the criss-cross lines) completely off from the rest of the pouch. A circular sealing area 39 is shown in FIGURE 8 to seal off the puncture from the rest of the pouch. A circular sealing area 39 is shown in FIGURE 8 to seal off the puncture from the rest of the pouch while a U-shaped sealing area 40 is sealed together and cooperates with a portion of the edge seal of the pouch to completely separate the puncture 38 from the rest of the pouch shown in FIGURE 9. This is, of course, necessary to retain the aseptic qualities carefully imparted to the sealed pouch, as it is believed obvious that if the area surrounding the puncture were not sealed off from the rest of the pouch, atmospheric gases containing impurities could seep in through the puncture and thus contaminate the fill located within the main body of the pouch. The seal area also prevents the fill, if remaining in a flowable condition within the pouch 15, from leaking out through the puncture 38.

In some cases, upon the withdrawal of the filler member 23 from the wall 24 in the area of the puncture 38, small deposits of the fill are located within the area bounded by the sealing area 39 or 40. Upon extended periods of storage these minute quantities of fill located within the area bounded by the sealing area 39 or 40 may be adversely affected, such as by decomposition, upon contact with the atmospheric gases and thus present an unsightly and undesirable appearance or odor to the package as a whole. To avoid, it is desirable to completely seal the area bounded by the sealing area 39 or 40 dependent on the particular design of the sealing area as shown by either FIGURE 8 or FIGURE 9. It, of course, should be understood that the circular and U-shaped sealed areas as shown in FIGURES 8 and 9, respectively, are illustrative only and that designs limited only to the imagination and considerations to be hereinafter presented may be utilized to seal off the punctured area from the rest of the pouch.

A further embodiment of the present invention is illustrated in FIGURES 10 through 12 of the drawings, where a modified needle-like filler member 41 is shown. The member 41 is adapted to puncture the inflated portion 25 of the pouch 15 as shown cost clearly by FIGURE 11 and FIGURE 12 upon a larger scale. The construction of the needle-like filler member 41 is best shown in FIGURE 12 wherein an outer pointed filling duct 42 is provided with a reciprocable inner concentric tube 43 which serves as a vent for the gases which are replaced by the flowable material entering the pouch through the filling duct 42. Of course, it is obvious that the positions of the vent and filling duct may be reversed; that is to say, the filling duct 42 could become the vent and the vent 43 could become the filling duct.

The filler member 41 moves in line with the pouch 15 and punctures the inflated portion 25 thereof proximal to the top sealed portion of walls 24 and 26. With this modification the puncture 38 formed by the point of the filling duct 42 may be completely sealed off from the rest of the pouch while the filler member 41 is still in penetrating contact with the interior of the pouch 15. It is, of course, obvious that in utilizing such a procedure that it would be necessary to utilize the U-shaped area 40 as shown in FIGURE 9 or a like modification thereof.

With either of the modifications as hereinabove disclosed, many pouches may be filled at one time in contrast to the one shown and illustrated in the drawings. With such an arrangement it is also contemplated that the separately sealed pouches each may have a sealed edge in common which, during the filling operation, could be perforated so as to assist in the separation of one sealed pouch from the other. Of course, in the case of filling a single pouch, a single filler member is employed, but whenever groups of joined pouches are to be filled, multiple filler members would be employed so that the whole group of pouches would be filled and sealed simultaneously.

It is further contemplated that in those cases where desired, a sterile ray lamp could be mounted in such a position so as to impinge upon the pointed head of the filler member so as to minimize the possibility of a chance bacteria being introduced inside of the pouch 15 upon puncture of the inflated portion 25.

The filler member 23 or 41 could also be operated as follows. Upon the filling of the pouch 15 to the desired level a nonoxygen containing gas, such as nitrogen, could be introduced through the filling duct so as to sweep out any remaining portions of the atmospheric gas that might be contained within the filled pouch. It is also contemplated that steam could be introduced in the same manner so as to sweep out any remaining undesirable gases. It is pointed out at this time that such a purging operation could be carried out simultaneously with the filling by incorporating means such as a third concentric tube (not shown) with the filler member 23 or 41.

Figure 13:
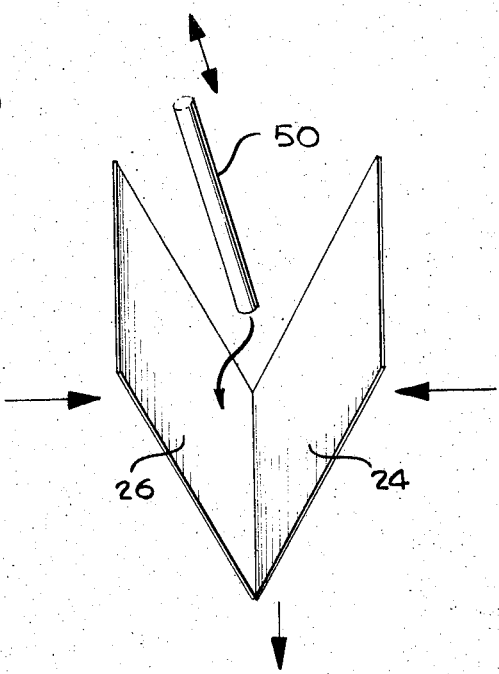
FIGURE 13 is a schematic representation of the introduction of an alkylene oxide sterilization substance into a pouch during the formation thereof.

The preparation of a sterile or pre-sterilized pouch is shown schematically in FIGURE 13 where an alkylene oxide introduction means 50 is shown for introducing the sterilizing substance into the space between the forward wall 24 and the rear wall 26 which are closed and sealed to produce the sealed pouch which is to be filled by the filling method contained in the present method as above set out. The step performed at the alkylene oxide introduction station may be performed by use of a stationary introduction means 50 and a movement of the pouch wall 24 and 26 with respect thereto or by use of a reciprocating introduction means 50 and stationary pouch walls with respect to the introduction site or by a combination of the movements set out.

The alkylene oxide may be introduced as either ethylene oxide or propylene oxide together with inert gases or water as either liquid or gas. A commonly used sterilization mixture is that of ethylene oxide and carbon dioxide which may be advantageously used in the present method. Water in the form of water vapor or liquid may be added with the ethylene oxide in the sterilization mixture at this step where desirable. It is the preferred method of introduction of propylene oxide to use several drops of propylene oxide in a small quantity of water for each pouch sterilized.

Specific mixtures of alkylene oxide are known in the prior art as are minimum concentration per cubic inch of space within the article to be sterilized. Mixtures and minimum concentrations from the prior art may be employed in accordance with the present invention. Such prior art is described in McDonald, 3,068,064, Mrak et al., 2,511,987, and Leuthner, 3,069,734.

The introduction of the sterilization substance by introduction means 50 is particularly advantageous when the pouch wall material for walls 24 and 26 are of the gas impervious-type. An example of such a material type is set out above as being a polymer-metal foil laminate. The method can be employed for gas permeable materials such as polyethylene and vinyl polymer pouches with like results.

The introduction of the alkylene oxide is at ambient temperatures and pressures and after sealing, are retained in the sealed pouch for a time period sufficient to kill all of the objectionable micro-organisms present by normal manufacturing and processing conditions. Such micro-organisms are of several types. The yeast and numerous other of the easily killed varieties of micro-organisms have outer surfaces that are thought to consist mainly of macro-molecular lipids, in which the alkylene oxide gases are readily soluble. Consequently, such organisms are rapidly killed by alkylene oxides whether or not moisture is present.

Other organisms assume a spore stage as the dormant phase and as such are very impervious to such gases as alkylene oxide. These spore forms have a surface which is believed to be composed of a large percentage of cellulose derivatives cells. Dehydrated cellulose is a very effective gas barrier, while hydrated cellulose is an extremely poor gas barrier. Therefore, it becomes necessary to add moisture to the alkylene oxide sterilization gases and liquids in order to hydrate the cellulose of the surface cells so that the organisms will absorb a lethal quantity of the gases.

The necessity of adding moisture to facilitate the killing of spores is most essnetial when short exposure times are involved and becomes less important when longer exposure times are involved. This is true in that sufficient exposure time permit alkylene oxide gases to penetrate even dehydrated cellulose.

An exposure time of at least three hours is sufficient to kill the micro-organisms of the type set out above. By the addition of moisture to the sterilization substance, such time is sufficient to kill even spore form micro-organisms. In practice much longer times are available as the sealed pouch with the alkylene oxide therein is stored and shipped during this time which requires days or weeks.

Several of the known aseptic packaging methods for solids carry out a sterilization step after the packaging under make-and-fill conditions by subjecting a large volume of finely divided dry powder to the action of a sterilization gas such as an alkylene oxide gas. The large surface area available in the powdered material presents the problem of picking up what slight moisture there is available in the air of the packaging environment. As a result, significant amounts of moisture must be introduced with the alkylene oxide if any rapid oxidation of the alkylene oxide upon the spores is to be achieved. The present method is directed to introduction of the alkylene oxide to sterilize prior to the introduction of the sterile fill into the pre-sterilized pouch container and, hence, this moisture pick-up is not a problem as the pouch is empty when the sterilization gas is introduced. The only area available for moisture absorption is the limited area of the interior surface of the pouch. Consequently, ambient moisture is usually sufficient when adding a gaseous alkylene oxide to the pouches for the killing of spores without the addition of more moisture. However, for controlling the moisture addition to control the variable of ambient humidity, a small amount of moisture may be continuously added to each pouch as it is formed in the sterilization gas introduction station.

Figure 14:
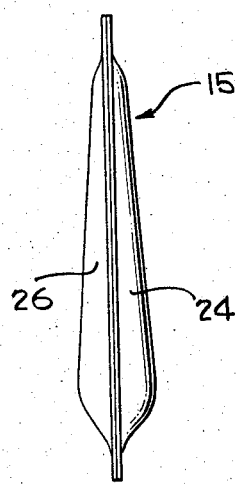
FIGURE 14 is an end view of a sealed pre-sterilized pouch prior to the step of supporting of the pouch in a position to be filled as shown in FIGURE 1.

By the use of the sterilizing method set out above a pouch 15 having front and rear walls 24 and 26, respectively, may be produced as shown in FIGURE 14. The sealed pouch is empty except for the presence of an alkylene oxide together with the presence, where used, of moisture and inert diluents. By the use of the sterilization gas prior to the introduction of the fill into the sterilized pouch, the maximum amount of the alkylene oxide present in the fill may be controlled to below the maximum amount permissible by Federal Drug Administration regulations. Thus, the alkylene oxide sterilization substance may be introduced in either gaseous or liquid state by the introduction means 50, shown in FIGURE 13, to produce the sealed pouch having the sterilization substance therein of FIGURE 14. Thereafter, the pouch may be stored for a time sufficient to allow the sterilization substance to kill all objectionable micro-organisms present. Thereafter, upon filling of the pouch, after puncturing of one of the walls thereof, the alkylene oxide may be removed as a gas prior to the introduction of the fill material. All of the steps in the present method may be conducted so as to attain aseptic conditions.

It has been found to be practically impossible to attempt to sterilize a container containing a finely divided powdered material with ethylene oxide and then to immediately seal the package due to the absorption of the ethylene oxide on the vast surface area of the powdered material and still provide a packaged product having an ethylene oxide content lower than or equal to the maximum amount permissible by Federal Drug Administration regulations. Such methods as this, found in the known art, are no longer possible in commercial practice as the only method of reducing the ethylene oxide content to the permissible level would be to tumble under reduced pressure in order to remove the absorbed gas and to do so the fill would have to be removed completely from the sealed pouch of the present invention.

As has been above explained, it is thus possible by utilizing the equipment set forth above in the manner contemplated to fill previously sterilized pouches with sterilized material under sterile conditions so as to obtain an aseptic product filled pouch which will not become contaminated or decomposed when subjected to long periods of storage.

While preferred structural details and methods are disclosed herein, it is to be understood that variations both in structure and method, e.g. (by utilizing compartmented pouches with a different fill introduced into each compartment) may be provided without departing from the spirit and scope of the invention as defined in the appended claims.

I claim:

1. The method of filling a sealed pre-sterilized pouch, said pouch pre-sterilized by introduction of a volatile alkylene oxide prior to the sealing thereof and retaining the alkylene oxide for a time period sufficient to kill all micro-organisms, comprising the steps of supporting a pouch in a position to be filled, inflating a portion of said pouch utilizing the gases inherently sealed therein, moving a filler member through one wall of said pouch within said inflated portion for communication with the interior of said pouch, introducing flowable material into said pouch through said filler member while simultaneously removing the gases trapped within said pouch, and completely sealing off the puncture formed by said filler member from the rest of the pouch.

2. The method of claim 1 in which the gases contained within the pouch are heated so as to effect the inflation of the pouch.

3. The method of claim 1 in which the inflation of said portion of said pouch is accomplished by squeezing the remaining portions of the pouch so as to force the gases sealed therein into said inflated portion.

4. The method of claim 1 in which a plurality of pouches are simultaneously supported, filled and sealed.

5. The method of claim 1 in which said moving of a filler member through one wall of said pouch is aided by application of suction to the exterior of the pouch in the area about the filler member.

6. The method of claim 1 in which the gases within the pouch are swept therefrom by a gaseous purging agent subsequent to the introduction of the flowable material into the pouch.

7. The method of claim 1 wherein a gaseous purging agent is simultaneously introduced into the pouch along with the flowable material.

8. The method of claim 1 in which the gases within the pouch are removed therefrom by communication of the pouch with an evacuated space.

9. The method of claim 1 in which the pouch is sterile, the fill is an aseptic flowable material and the entire process is carried out under generally sterile conditions.

10. The method of filling a sealed pre-sterilized pouch, said pouch pre-sterilized by introduction of ethylene oxide gas prior to the sealing thereof and retaining the gas for a time period sufficient to kill all micro-organisms, comprising the steps of supporting a pouch in a position to be filled, inflating a portion of said pouch utilizing gases inherently sealed therein, moving a filler member through one wall of said pouch within said inflated portion for communication with the interior of said pouch, introducing flowable material into said pouch through said filler member while simultaneously removing the gases trapped within said pouch, and completely sealing off the puncture formed by said filler member from the rest of the pouch.

11. The method of filling a sealed pre-sterilized pouch, said pouch pre-sterilized by introduction of a mixture of propylene oxide in water prior to the sealing thereof and retaining the mixture for a time period sufficient to kill all micro-organisms, comprising the steps of supporting a pouch in a position to be filled, inflating a portion of said pouch utilizing gases inherently sealed therein, moving a filler member through one wall of said pouch within said inflated portion for communication with the interior of said pouch, introducing flowable material into said pouch through said filler member while simultaneously removing the gases trapped within said pouch, and completely sealing off the puncture formed by said filler member from the rest of the pouch.

12. A method of making and filling a sealed pouch under aseptic conditions comprising forming a pouch from a plastic sheet material, introducing a volatile alkylene oxide prior to sealing, completely sealing all edges of the sheet material to form a sealed pouch, retaining the alkylene oxide for a time period sufficient to kill all micro-organisms, supporting the pouch in a position to be filled, inflating a portion of said pouch using gases inherently present in the sealed pouch, moving a filler member through one wall of said pouch within said inflated portion for communication with the interior of said pouch, introducing flowable material into said pouch through said filler member while simultaneously removing the gases trapped within said pouch, and completely sealing off the puncture formed by said filler member from the rest of the pouch.

13. The method of claim 12 in which the alkylene oxide is ethylene oxide.

14. The method of claim 12 in which the alkylene oxide is propylene oxide.

15. The method of making and filling a sealed pouch under aseptic conditions comprising forming a pouch from a plastic sheet material, introducing a sterilizing mixture including the volatile alkylene oxide prior to sealing, completely sealing all edges of the sheet material to form a sealed pouch, retaining the alkylene oxide for a time period sufficient to kill all micro-organisms, supporting the pouch in a position to be filled, inflating a portion of said pouch utilizing gases from the sterilizing mixture, moving a filler member through one wall of said pouch within said inflated portion for communication with the interior of said pouch, introducing flowable material into said pouch through said filler member while simultaneously removing the gases trapped within said pouch, and completely sealing off the puncture formed by said filler member from the rest of the pouch.

16. The method of claim 15 in which the sterilizing mixture is ethylene oxide and a diluent gas inert to the ethylene oxide.

17. The method of claim 15 in which the sterilizing mixture is propylene oxide in water and an inert diluent gas, and in which the substances contained within the pouch are heated so as to effect the inflation of the pouch.

18. A method of filling a sealed pouch comprising the steps of supporting a pouch in a position to be filled, inflating a portion of said pouch utilizing gases inherently sealed therein, moving a filler member through one wall of said pouch within said inflated portion for communication with the interior of said pouch, introducing flowable material into said pouch through said filler member while simultaneously removing the gases trapped within said pouch, and completely sealing off the puncture formed by said filler member from the rest of the pouch.

19. The method according to claim 18 wherein the gases contained within the pouch are heated so as to effect the inflation of the pouch.

20. The method according to claim 18 wherein the inflation of said portion of said pouch is accomplished by squeezing the remaining portions of the pouch so as to force the gases sealed therein into said inflated portion.

21. A method of filling sealed pouches comprising the steps of supporting a pouch in a position to be filled, inflating a portion of said pouch utilizing gases inherently sealed therein, moving a filler member through one wall of said pouch within said inflated portion for communication with the interior of said pouch, introducing flowable material into said pouch through said filler member while simultaneously removing the gases trapped within said pouch, removing the filler member from the wall of the pouch, and completely sealing off the puncture formed by said filler member from the rest of the pouch.

22. A method of filling a pouch comprising the steps of supporting a pouch in a position to be filled, inflating a portion of said pouch utilizing gases inherently sealed therein, moving a filler member through one wall of said pouch within said inflated portion for communication with the interior of said pouch, introducing flowable material into said pouch through said filler member while simultaneously removing the gases trapped within said pouch, completely sealing off the puncture formed by said filler member from the rest of the pouch and removing the filler member from the wall of the pouch.

23. The method according to claim 21 wherein the puncture is sealed off from the rest of the pouch by a sealed area completely surrounding said puncture.

24. The method according to claim 22 wherein the puncture is sealed off from the rest of the pouch by a sealed area which in cooperation with at least one edge of the pouch completely surrounds said puncture.

25. The method according to claim 23 wherein the entire area surrounded by said sealed area is also sealed.

26. The method according to claim 24 wherein the entire area surrounded by said sealed area is sealed after the filler member is withdrawn from the pouch.

27. The method according to claim 18 wherein a plurality of pouches are simultaneously supported, filled and sealed.

28. The method according to claim 18 together with the step of holding the filler member to said one wall of the pouch by suction.

29. The method according to claim 20 wherein the squeezing of the remaining portions of the pouch is terminated once the filler member has punctured the pouch wall and is properly in position to introduce a flowable material to the interior of the pouch.

30. The method according to claim 18 wherein the gases within the pouch are swept by a gaseous purging agent subsequent to the introduction of the flowable material into the pouch.

31. The method according to claim 18 wherein a gaseous purging agent is simultaneously introduced into the pouch along with the flowable material.

32. The method according to claim 18 wherein the pouch is sterile, the fill is an aseptic flowable material and the entire process is carried out under generally sterile conditions.

References Cited by the Examiner

UNITED STATES PATENTS

| | | | |
|---|---|---|---|
| 2,861,406 | 11/1958 | Holsman et al. | 53—112 X |
| 2,888,788 | 6/1959 | Gebhardt | 53—112 X |
| 2,917,878 | 12/1959 | Carnarius et al. | 53—22 |
| 2,928,216 | 3/1960 | Orsini | 53—22 |
| 3,084,791 | 4/1963 | Hawley | 206—46 |
| 3,104,012 | 9/1963 | Beamish | 206—46 |

TRAVIS S. McGEHEE, *Primary Examiner.*